United States Patent [19]
Mason

[11] 3,734,466
[45] May 22, 1973

[54] LIFT DEVICE FOR VARIABLY DISPLAYING AND FACILITATING REPAIRS OF VEHICLES SUCH AS SNOWMOBILES

[76] Inventor: Merle C. Mason, Route 2, Spicer, Minn. 56288

[22] Filed: July 12, 1971

[21] Appl. No.: 161,750

[52] U.S. Cl. ................................254/89, 254/134
[51] Int. Cl. .............................................B66f 7/00
[58] Field of Search ......................254/89, 92, 7 B, 254/133, 45, 2, 4, 47

[56] References Cited

UNITED STATES PATENTS

| 2,997,292 | 8/1972 | Lucker et al. | 254/7 B |
| 3,155,373 | 11/1964 | Rae | 254/45 |

*Primary Examiner*—Othell M. Simpson
*Assistant Examiner*—Robert C. Watson
*Attorney*—George F. Williamson, H. Dale Palmatier and Herman H. Bains

[57] ABSTRACT

A lift device for variably supporting vehicles such as snowmobiles to facilitate display and repair thereof, employs a pair of rigidly supported, upstanding mounting posts variably spaced apart distances to longitudinally accommodate vehicles varying in length. An adjustable supporting assembly is slidably mounted on each of said posts, one assembly being constructed for interconnection with the rear part of the vehicle on a horizontal axis which is substantially in alignment with the longitudinal center of gravity of the vehicle. The second supporting assembly, slidably adjustable on the second post fixedly carries a trunnion-like horizontal member for rotative interconnection and support of a forward hub member of a laterally adjustable unit. Said unit is constructed for lift-interconnection with conventional elements of a number of vehicles varying in width, and which elements are conventionally disposed below the front of the body and adjacent the sides thereof. The said forward hub of the adjustable unit in use will also be disposed substantially in alignment with the longitudinal center of gravity of the vehicle. With such rotative support connections substantially aligned with center of gravity the vehicle, when elevated to a desired position for viewing or repair may be angularly swung to numerous positions along the center of gravity line, even to an inverted position and positive locking means are provided for retaining the hub and vehicle in any one of a number of desired positions.

6 Claims, 5 Drawing Figures

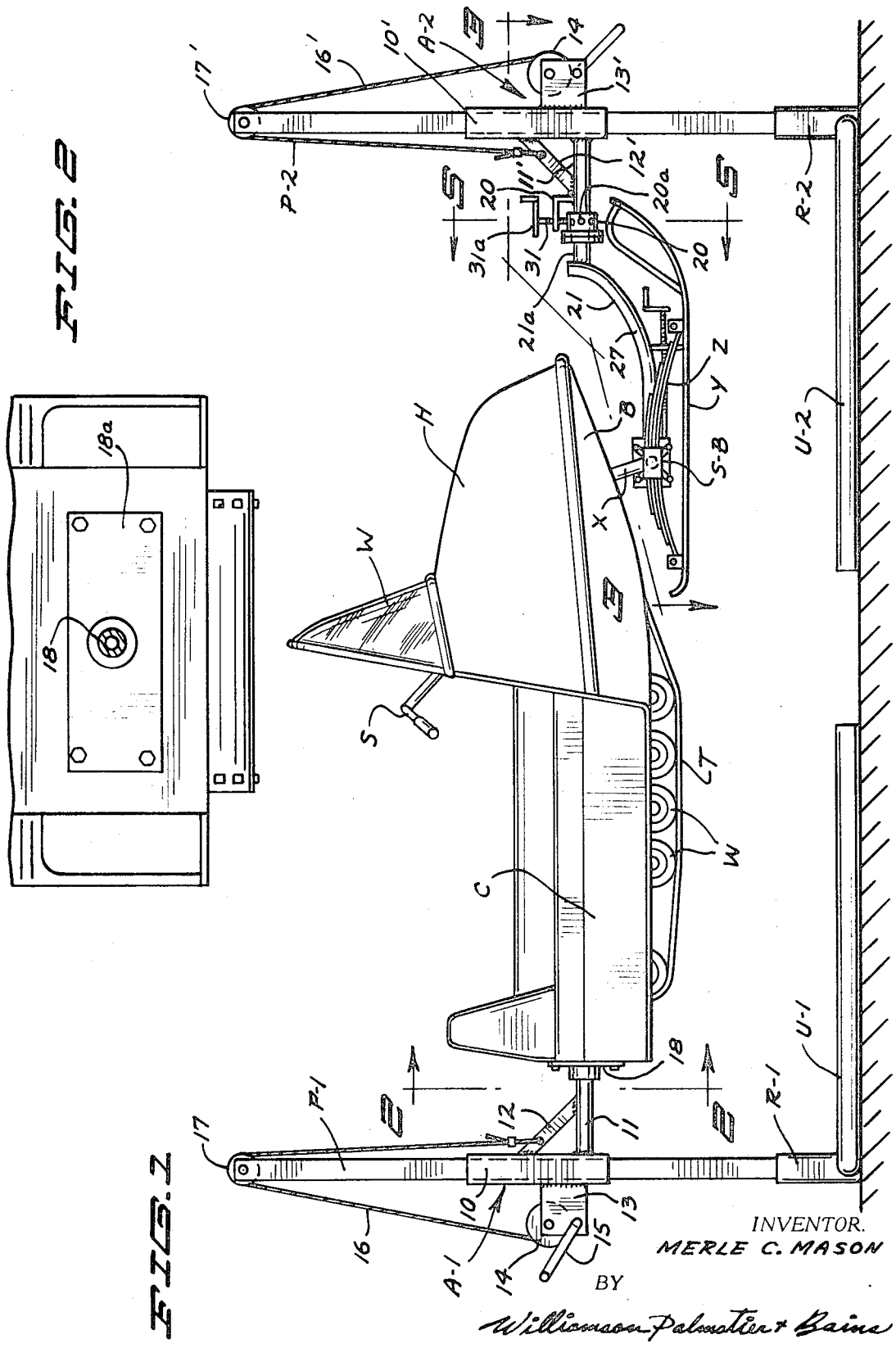

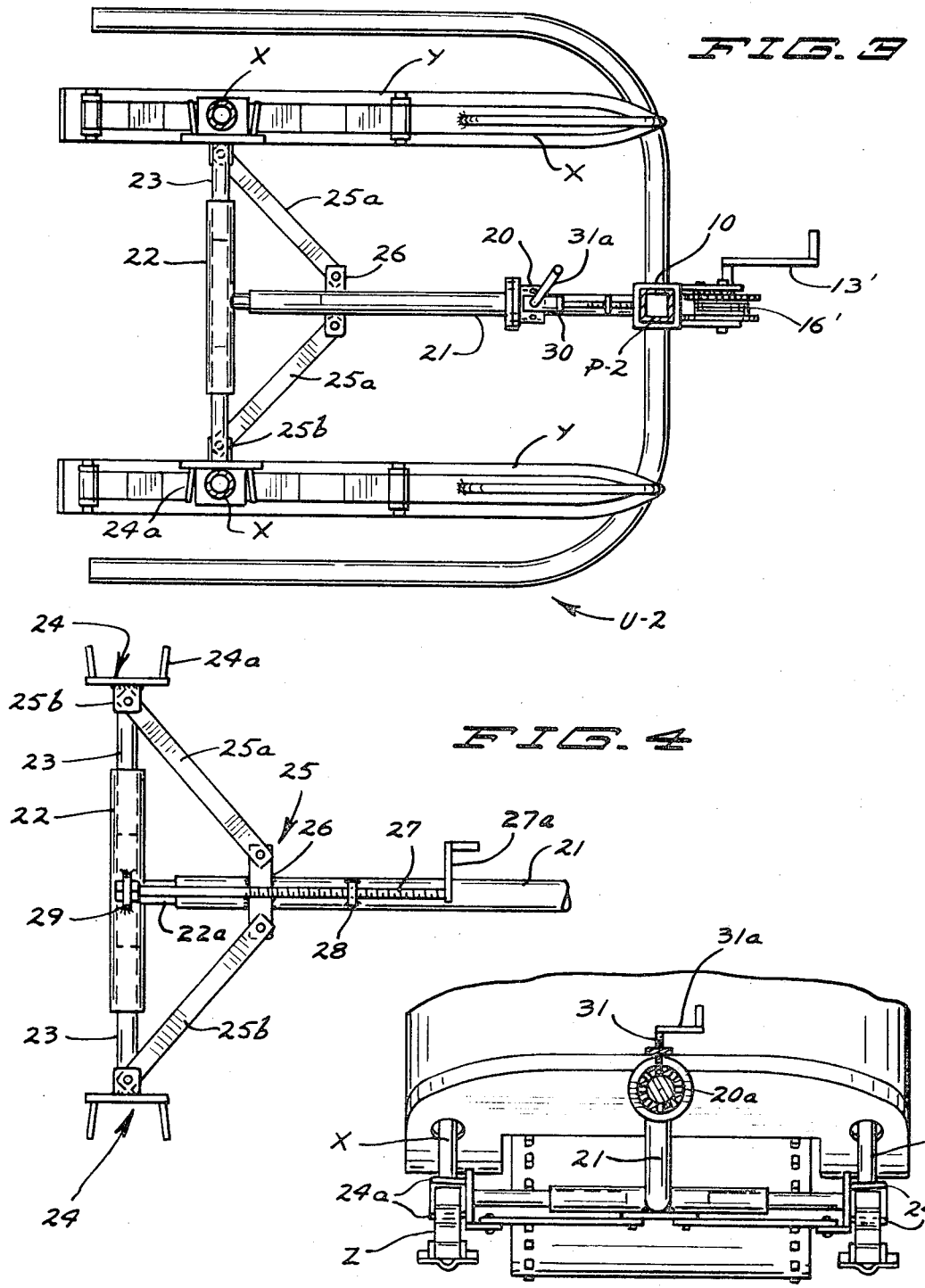

LIFT DEVICE FOR VARIABLY DISPLAYING AND FACILITATING REPAIRS OF VEHICLES SUCH AS SNOWMOBILES

This invention relates to a device or lift for variably supporting vehicles such as snowmobiles for display and repair purposes.

While the particular embodiment of the invention disclosed is adapted for use with conventional types of snowmobiles, it will be understood that the concepts of my invention include and are equally applicable for use with many other types of vehicles including bag-type, all terrain vehicles, riding mowers and numerous vehicles adapted for land and water transportation.

It is an object of my invention to provide a device of the type described which will variably support a vehicle such as a snowmobile from the rear and forward portions thereof and along those points substantially coincident with the center of gravity of the assembled vehicle, and which will further provide for locked, elevated support of said vehicle not only in its normal horizontal operating position, but also in a plurality of horizontal positions angled thereto and including an inverted position which will enhance and enlarge the exhibiting of all external parts of the vehicle as well as facilitate replacement of parts and repair of the vehicle.

A further object is the provision of a variable display and repair lift for vehicles which may be readily assembled and densely compacted for storing and shipping purposes.

My improved device and lift employs a pair of rigidly supported, upstanding posts which may conveniently be spaced apart at different distances to more than encompass the lengths of snow-mobiles and many other types of terrain and water vehicles varying considerably in length, together with a pair of vertically adjustable support assemblies mounted respectively on the two posts and each carrying inwardly and opposed trunnion elements or the like which, in use, are adjusted for height to be disposed axially, substantially in alignment with the center of gravity of the vehicle. From the two trunnion elements of the supporting assembly are engaged hubs, one for the rear of the vehicle fixedly mounted thereon in alignment with the center of gravity of the vehicle, and the second hub element mounted for locked adjustment oscillation on the front trunnion, and having rigidly affixed thereto an adjustable supporting mechanism which has elements which can be adjusted transversely of the vehicle for variable lateral spaced relation to interlock or engage with standard elements of the vehicle related with the traction of the forward portion thereof.

With the adjustments previously set forth relative to the spacing apart of the upright supporting posts and the spaced adjustment of the mechanism which interlocks with standard elements related to the forward traction elements of the vehicle, the snow-mobile or other vehicle may be readily engaged in a ground-supported position, then elevated manually by an operator and when desired, tilted along a line approximating the center of gravity of the entire vehicle and retained in a desired tilted position or in an extreme invert position to expose all external parts for exhibit or repair.

The foregoing and other objects will be more readily apparent from the following description made in connection with the accompanying drawings wherein:

FIG. 1 is a side elevation showing an embodiment of my device operatively applied to lift and retain in elevated position a snowmobile in its normal operative position;

FIG. 2 is a rear elevation of the snowmobile, actually a cross section taken on the line 2—2 of FIG. 1;

FIG. 3 is a section taken on the jagged line 3—3 of FIG. 1 showing the adjustable support arm connections for the underfront portion of the snowmobile or other vehicle;

FIG. 4 is a bottom plan view showing more in detail the toggle mechanism for varying the spaced relation of the runner engagement members; and FIG. 5 is a vertical section taken along the line 5—5 of FIG. 1.

Referring now to the drawings in detail, an embodiment of my invention is illustrated, particularly adapted for adjustable support of a snowmobile to facilitate repairs thereof, and to advantageously in a number of different positions, display the same.

The snowmobile illustrated has the usual forward hood H, a windshield W, steering control S, a forward or bow deck B, and a driven track T of endless form, trained about a plurality of track wheels W which are supported in the bottom, medial and rearward portions of the rear chassis C. A back-supporting rider seat is disposed in conventional manner at the rear portion of the vehicle.

My lift and variable support device includes a pair of rigidly mounted support posts P-1 and P-2 respectively, being as shown, rigidly supported from U-shaped ground-engaging bases U-1 and U-2. The lower ends of the posts P-1 and P-2 as shown, are removably telescoped in upstanding post-receiving sockets R-1 and R-2 respectively.

The post P-1 and its related base U-1 and other elements are designed for connection and support with the rear of the snow-mobile while post P-2 and its related elements U-2, R-2 and other elements to be explained hereafter, are for lift and support in various positions, of the forward portion of the snowmobile or other vehicle.

The post P-1 has a supporting assembly indicated as an entirety by A-1, slidably mounted thereon, while the post P-2 has a supporting assembly indicated as an entirety as A-2, slidably mounted thereon. The rear supporting assembly A-1 includes a sleeve 10 preferably of squared construction, slidably mounted on the squared post P-1 and at its lower portion carrying a perpendicular and horizontal trunnion sleeve 11 which is rigidly braced by an oblique brace arm 12 interconnected with the medial portion of the sleeve 10. The ends of the diagonal brace 12 are heavily welded or otherwise rigidly secured to the upper portion of trunnion 11 and the inside portion of the sleeve 10.

The assembly A-1 has rigidly attached to the rear of sleeve 10 a U-shaped bracket 13 which carries a ratchet winch 14 employing a crank handle 15 which has gear connection for driving the roller of the winch 14. A cable 16 is trained about the roller of winch 14 and passes over a top pulley 17 rotatably mounted in the upper extremity of post P-1 and therefrom the cable 16 descends and is attached at its lower end as shown, to an intermediate portion of the brace bar 12.

Mounted centrally and rigidly at the center of the rear end of the vehicle, is a flanged tubular hub 18 having its axis disposed approximately concentrically of the center of gravity of the snowmobile or other vehicle. The interior of hub 18 telescopes over the extremity of the trunnion shaft 11 and it is desirable that the telescoped relation have substantial area and extend for at least two inches.

Referring now to the front portion of my mounting structure the supporting assembly A-2 is provided with a rotary winch device 14' having a winch roller which is journaled in a forwardly projecting U-shaped bracket 13' similar to the bracket for post P-1, and a slide sleeve 10' is also employed having braced rigid connection by diagonal brace 12', with a trunnion shaft 11' which extends horizontally and rigidly from the sleeve 10'.

Rotatably telescoped over the terminal portion of trunnion 11' is a heavy locking hub 20, this hub 20 being rigidly affixed and reinforced in its connection with a downwardly and rearwardly curved, central support bar 21 which is disposed longitudinally and centrally below the bow deck B of the vehicle and which constitutes an important part of a laterally adjustable unit for connection at spaced points transversely of the vehicle with conventional depending components of the vehicle. This unit has interlocking connection elements as will be later explained, for variable and adjustable connection with vehicles varying considerably in width and spacing of certain conventional depending components. Support arm 21, at least in the portion opposite its rigid connection with the hub 20 is tubular to telescopically and slidably receive the stem 22a of a tubular cross head 22. In the terminal portions of the cross head 22 are slidably mounted shafts 23 telescoped therein and each of said shafts at its outer terminal rigidly carries a lock-engagement component 24, as shown in the form of a plate rigidly carrying in spaced relation, two sets of spaced, interlocking fingers 24a.

Mechanism indicated in entirety as 25 is provided for simultaneously projecting or retracting the components 24 and the engagement fingers 24a carried thereby. As shown, such mechanism comprises a head 26 fixed in transverse horizontal relation to rigid support bar 21 at a distance somewhat removed from the terminal thereof. Toggle links 25a are pivoted at their inner ends near terminal portions of the fixed head 26 and extend in substantially a horizontal plane, diagonally of the support bar 21 with their outer ends pivotally connected at 25b with reinforced connections of the lock-engagement components 24. An elongate worm or screw 27 actuated at its forward end by a crank handle 27a is swivelly engaged at an intermediate point by a guiding lug 28 and at its outer extremity by a thrust bearing lug 29. The fixed head 26 is internally threaded to advance the elongate screw 27 and with it to advance the cross tube 22 when the screw is turned by crank 27a in one direction. Thus, when the tubular cross head 22 is moved outwardly (to the left as shown in FIGS. 3 and 4) the toggle linkage 25a assumes the relationship of a lesser angle and the lock-engaging components 24 are drawn inwardly from the position shown in full lines. It will be seen that with the worm and toggle mechanism indicated as an entirety by the number 25, lateral movements of the tubular cross head 22 in outward and inward directions, retract and expand the positioning of the lock-engaging components 24. The threaded engagement between screw 27 and the tapped interior of fixed head 26 lock the components 24 in the desired adjusted position and prevent displacement of the engagement fingers 24a with the essential parts of the snowmobile with which they are engaged in use.

OPERATION

In use the snowmobile or other vehicle may be driven or otherwise positioned on a floor or ground area where it is to be lifted and displayed or repaired through the use of my novel structure. The rear and front lift assemblies of my device are then appropriately positioned to lengthwise accommodate the vehicle (which may be quickly accomplished manually since the ground-engaging bases U-1 and U-2 may be easily slid over the floor or ground support). In the commercial form of my structure recently made and sold, and utilizing a suitable aluminum alloy for the tubular parts including the bases U-1 and U-2, the posts P-1 and P-2, the tubular slides 10 and 10', and other tubular parts, each section (front and rear) of the device when assembled, weighs less than 80 pounds. It will be noted that the legs of the support bases U-1 and U-2 are preferably spaced widely enough apart to be positioned outwardly of the body of the vehicle and in the case of a snowmobile, also outwardly of the forward ski runners.

Ratchet winches 14 and 14' of the two sections are then released to, with attention by the operator, dispose the journals 11 and 11' in proper relationship to first make connection between the rear trunnion 11 of the rear lift with the heavy sleeve 18 mounted centrally in horizontal position at the rear of the vehicle. The forward and aft precise position of post P-2 is then determined with the supporting assembly A-2 of the front lift unit, to obtain proper alignment of the two sets of engaging and interlocking fingers 24a with the spring bolsters SB of the two front runners of the snowmobile, and in this connection the adjustment of the worm 27 is manipulated through its crank handle 27a to bring about proper spaced relations between the components 24 for the particular type of snowmobile or other vehicle to be lifted. Thereafter the heavy support arm 21 carrying a laterally adjustable mechanism is connected with the heavy trunnion 11a of assembly A-2 for the front lift with the lock sleeve 20 journaled on the outer part of trunnion 11a and initially locked by manipulation of the handle 31a for horizontally positioning the vehicle.

Thereafter, preferably by two attendants, ratchet winches 14 are turned to gradually elevate the supporting assemblies A-1 and A-2 simultaneously.

It will be understood that in display of the vehicle at various angulations and in invert positions, different elevations thereof are desirable. When the winches 14 and 14' have been operated to lift and retain the assemblies A-1 and A-2 in the desired elevation as shown in FIG. 1, the vehicle from front and rear is actually supported on a continuous horizontal axis approximating the axis of the longitudinal center of gravity of the vehicle, of course with the supporting trunnions 11 and 11' opposed and coaxial.

If it is desired to swing or tilt the vehicle from its normal horizontal position shown in FIG. 1, the lock screw 31 may be released from the lock hub 20 and the vehicle may be manually swung into a position where the lock screw 31 will register and pass through one of the radial apertures 20a for locking the hub in an angulated position to the original position. For proper exposure of various portions of the exterior of the vehicle (during repair or display) it is desirable to have from 6 to 8 radial locking apertures 20a formed in the hub 20. When the hub is released from the lock screw 31 little manual effort is required to bodily twist or tilt the vehicle swivelled at approximately its longitudinal center of gravity.

In displaying the snowmobile or other vehicle to prospective customers it is desirable often to expose to view various external portions of the vehicle. My novel lift device not only makes this possible but provides for longitudinal support of the entire vehicle at various elevations from the ground or other supporting surface.

Likewise, when it is desired to repair or make replacement of parts on the vehicle my lift structure greatly facilitates the same as will be readily appreciated.

Another important feature of the invention and its combination of components resides in the wide adjustability of the overall device to properly engage and interlock with, as well as lift snowmobiles and other vehicles which vary substantially in length, width, and positioning of front support means such as the runners on the snowmobiles. Adjustment for vehicles which vary in length is readily accomplished by manually controlling the spaced relations of the two upstanding posts P-1 and P-2 with supporting assemblies A-1 and A-2 mounted thereon. Adjustment for varying spaced relation between the runner-spring-bolsters on various makes of snowmobiles is readily accomplished by the unit (or its equivalent) attached to the rearward portion of the heavy support arm 21 and which mechanism, when controlled by the worm 27, provides for simultaneous protraction or retraction of the lock-engagement components 24 with their interlocking two sets of fingers 24a.

It will be understood that for variably supporting other vehicles which may utilize wheels or other supporting medium under the front portion of the body thereof, appropriate lock-engagement components may be readily designed within the scope of my invention for interlocking with such depending components of the vehicles as axles, axle housings, spring bolsters, or the like.

While the numerous essential components of my lift structure occupy substantial space and volume when assembled and put into use, the entire device may be readily dissembled and compacted into small volume for storage and shipment. In dismantling the device the curved support bar having the locking hub 20 rigidly attached to the forward end thereof may be removed from trunnion 11' of support assembly A-2 by releasing screw 31 and bodily disconnecting arm 21 and its toggle cross head assembly. Thereafter the posts P-1 and P-2 with assemblies A-1 and A-2 thereon may be readily and slidably removed from the upstanding sockets R-1 and R-2 of the base support sections. Thereafter, if desired, the two cables 16 and 16' of the supporting assemblies may be loosened and disengaged from pulleys 17 and 17' and the supporting assemblies A-1 and A-2 removed from the posts by downward sliding thereon. The numerous parts may then be compactly housed within a relatively shallow rectangular carton or container by superimposing, successively, the U-shaped bases U-2 and U-1; then positioning the posts in substantially the same general plane as the base sections; then detaching the toggle links 25a from their pivotal connection with fixed head 26 with subsequent slide withdrawal of the adjustment shafts 23. The two adjustment shafts with the lock-engagement components 24 may then be angled to be accommodated within the confines of the U-shaped bases and posts P-1 and P-2 which lie in parallelism to the legs of the base sections U-1 and U-2. The curved arm 21, with the fixed head 26 and the hub 20 may be disposed and accommodated between the legs of the U-shaped bases. In commercial embodiments of my device now manufactured, the compacted, dissembled device may be housed in a suitable carton having a length approximating 6 feet, a width approximating 4½ feet and a depth approximating 1 foot.

From the foregoing description it will be seen that I have conceived and provided a lift device for variably supporting vehicles such as snowmobiles, which may be readily assembled and properly positioned with reference to a vehicle supported on floor or ground, and which with a minimum of manual effort, makes possible the support of the vehicle on horizontally aligned axes and at variable heights.

It will further be seen that with the support and adjustment facilities of my invention, in an elevated position the vehicle may be tilted or turned and retained in a plurality of various angle positions, to permit close examination of various parts of its external contour and elements, thus enhancing display to prospective customers as well as facilitating positioning of the vehicle most advantageously for replacement of parts or repair.

Where in the appended claims the terms "hub" and "trunnion" are together employed, it will be understood that such terms are employed in their broadest sense and shall be understood to include any cooperating connection elements which provide for oscillatory connection between an elevated supporting assembly and a unit interconnected with front or rear portions of a vehicle.

What is claimed is:

1. A device for variably supporting vehicles such as snowmobiles for display and repair purposes, having in combination, a pair of rigidly supported, upstanding mounting posts spaced apart a distance somewhat more than adequate to accommodate therebetween the length of the vehicle to be supported, a pair of adjustable support-assemblies each slidably mounted on one of said posts, means associated with each of said assemblies for adjustably elevating the same and for retaining the assembly in desired elevated positions, said assemblies having opposed and axially alignable horizontal vehicle-support members, one of said support assemblies comprising a pair of rearwardly extending spaced attachment elements constructed to engage and interlock with conventional laterally spaced parts (such as the runners) of the vehicle at the underside thereof.

2. The structure and combination set forth in claim 1 wherein said inwardly projecting supporting assembly comprises a pair of laterally adjustable attachment elements constructed to engage and interlock with conventional parts of the vehicle at the underside thereof.

3. The structure and combination set forth in claim 1 further characterized by, said inwardly projecting supporting assembly comprising a pair of spaced, rigid connection elements constructed to interconnect with conventional elements depending from the forward underside of the vehicle, and means for protracting and withdrawing said rigid connection elements laterally in relation to the length of the vehicle.

4. The structure and combination set forth in claim 1 wherein said inwardly projecting supporting assembly comprises;

elongate rigid means extending downwardly and rearwardly from said rigidly connected second hub to a position underlying the front portion of the vehicle, a pair of spaced vehicle-attachment members connected with the rear portion of said elongate rigid means and spaced laterally equi-distant therefrom, and mechanism connected with said pair of spaced vehicle-attachment members for adjustably spreading them apart as well as retracting them.

5. The structure and combination set forth in claim 4 wherein;

said mechanism contains means for locking said vehicle-attachment members in all adjusted positions.

6. The structure and combination set forth in claim 1 wherein said alignable, vehicle-support members constitute trunnion posts, and wherein a rigid hub is secured to the rear portion of said vehicle having an axis disposed substantially along the longitudinal center of gravity of the vehicle, said hub being mounted for oscillation on one of said trunnion members, a second hub mounted concentrically for oscillation on said second trunnion member and this hub rigidly carrying the inwardly projecting supporting assembly, and means for positively interlocking said last-mentioned hub with its supporting trunnion in a plurality of angularly rotative positions.

* * * * *